Patented Oct. 16, 1951

2,571,271

UNITED STATES PATENT OFFICE 2,571,271

STERILIZATION OF ION EXCHANGE BODIES

Henry Clay Marks, Glen Ridge, N. J., assignor to Wallace & Tiernan Products, Inc., Belleville, N. J., a corporation of New Jersey No Drawing. Application January 20, 1948, Serial No. 3,379

10 Claims. (Cl. 21—2)

In the operation of ion exchange systems, such as involve various compounds designed for the treatment of an aqueous liquid to remove mineral constituents or the like (e. g. by passing the liquid through a body of the selected compound), difficulty has arisen because of the tendency of bacteria and other organisms to collect and grow in the ion exchange material, and the problem of sterilizing the exchanger beds, i. e. to destroy the organisms at least sufficiently for avoidance of objectionable effects, has become of considerable consequence. An important object of the present invention is to provide a highly effective solution of this problem, and more specifically, to afford adequate sterilization of ion exchange materials without deleterious effect upon them or the liquid which they are employed to treat.

While bacterial growth is apt to accumulate undesirably in any kind of softening or demineralizing bed, there are special difficulties in the case of exchangers of organic composition, and particularly with materials of the class known as ion exchange resins; thus in a specific but most important sense the invention is directed to procedure for sterilizing beds of such organic substances.

These and other ion exchange materials are usually employed in a granular or like divided form, and the result of the growth of bacteria or fungi or both in the bed is not only to contaminate the liquid under treatment but also to clog the bed or to modify it physically in other respects so that either the rate of liquid flow is reduced or the body of material becomes badly channeled, with a consequent loss of efficiency.

It may also be explained that ion exchange resins, for example as employed to remove so-called mineral constituents from water or other aqueous liquids, are of two categories: (1) the cationic type, which removes metallic ions; and (2) the anionic type which in effect removes undesired anions from the water or solution, for example by removing the acid that is formed upon combination of such anions with hydrogen ions that may have previously been substituted for metallic ions, in the water, by the operation of a cationic exchanger. The cationic exchange materials are embodied in two alternative ways, e. g. to operate by removing metallic ions and replacing them with hydrogen ions, or to function in the so-called sodium cycle wherein the exchanger removes elements such as calcium and magnesium from the water and replaces them with sodium. Simply by way of convenient identification the last mentioned process may be described as the ordinary water softener type of demineralization, whereas the other described operations for removing anions or cations or both can be designated as effecting complete demineralization with respect to the type of ion involved.

All of these procedures are widely used, the water softening processes being employed both industrially and domestically on an extensive scale, and the more complete demineralization operations being useful in a great variety of commercial fields, e. g. in pharmaceutical plants and soft drink plants to obtain water that is equivalent to distilled water, and in industries such as sugar manufacture, for removing minerals from the syrup and thereby improving crystallization.

The ion exchange resins are of organic chemical composition, and have become so well known that an extensive description seems unnecessary here. Common examples of such resins of the cationic type are compositions made by condensing phenolsulfonic acids and formaldehyde, and corresponding examples of anionic exchangers are materials made by condensation of high molecular weight amines with formaldehyde. Although bacterial accumulations are apt to become quite objectionable with inorganic exchangers and although the compositions and treatments hereinbelow described are effective for sterilizing the mineral-type compounds, e. g. natural and synthetic zeolites, the problem of bacterial growth is especially severe with the synthetic resin materials. The organic composition of the latter provides an excellent source of food for organisms such as bacteria and fungi, encouraging luxuriant growth even to the extent, for instance, of converting a bed of the granular reagent material into a gelatin-like or gum-like condition. Nevertheless the synthetic ion exchange resins are at present usually preferred for many purposes (i e. over mineral substances such as the zeolites) because they have a much higher exchange capacity, a given quantity of exchanger being capable of removing mineral constituents from a larger volume or flow of a given aqueous liquid.

While it is usually possible to sterilize the purely mineral types of exchangers by applying high concentrations of chlorine water (containing so-called free available chlorine) or dilute hypochlorite solution from time to time, such treatments are highly objectionable in the case of the synthetic organic resins because the chemical reaction of the chlorine of hypochlorite in effect destroys some of the resin each time the treatment is carried out, and even over a moderate period of successive treatments the capacity and other physical characteristics of the exchanger bed deteriorate badly. Although steam has been used for sterilizing zeolite beds, it also is detrimental to the synthetic organic products. It should be appreciated that these resin materials are relatively expensive, and a bed of useful size represents a considerable investment; hence it is important that an installation last for a number of years without much replacement of the resin itself.

The present invention embraces the discovery that beds of the organic exchange material can be sterilized, without materially affecting their capacity or other properties, by simple and convenient treatment involving the application of chlorinated melamine, also and perhaps more usually known as chloromelamine. More specifically, it has now been found that safe and effective sterilization is obtainable by treating the ion exchange resin from time to time with a solution that contains chloromelamine having not more than four active chlorine atoms for each melamine group, specific compounds of such character being monochloro-, dichloro-, trichloro-, and tetrachloromelamine. Extensive tests have demonstrated the safety and effectiveness of these substances—within the stated limitation of chlorine content and when appropriately applied from time to time—for keeping an ion exchange bed in good operative condition, free from bacterial or like growth of undesirable nature. Both bacteria and fungi are killed throughout the body of material, and not only can heavy accumulations of slime and gelatinous growth be removed if they have occurred, but by periodical treatment any further clogging or other impairment of a serious sort can be prevented and the danger of contamination likewise avoided in practical effect, i. e. contamination of the liquid which the exchanger is used to treat.

Generally speaking the treatment is effectuated by passing a solution of the chloromelamine through the exchanger bed, preferably a retarded rate and conveniently at a time when the bed is removed from normal use, as far purposes of regeneration. In actual practice ion exchangers are periodically subjected to a regeneration treatment, which involves passing a suitable reagent solution and then a washing or rinsing liquid through the bed, and indeed in some cases, according to a further feature of the invention, the present procedure may be simplified by directly incorporating the stated sterilizing agent in one or another of the liquids involved in the regenerating cycle, e. g. as more particularly explained below. However practiced, the frequency of sterilizing treatment depends considerably upon the nature of the given ion exchange operation, and in any specific case may be readily determined, if necessary by simple trial or test. Thus if desired, sterilization can be effected every time the resin is regenerated; on the other hand, where regeneration must occur many times daily, as in the sugar industry, the sterilizing treatment need not always accompany it, as a general rule. For instance, the described chloromelamine solution may only have to be applied once a day, or once in every two or three days or indeed often no more than once a week or so, all as specific conditions may indicate.

By way of specific example, the solution of chloromelamine used, whether it is separately made and applied, or whether it also embodies a regenerating agent, should preferably contain between 20 and 100 P. P. M. (parts per million) available chlorine, i. e. provided by the chloromelamine and as determined in the manner customary for denoting available chlorine. The total quantity of solution used is preferably not less than about 10 gallons per cubic foot of resin, it being understood that the ion exchange materials are ordinarily measured in cubic feet of the more or less finely divided granular substance, as packed to the extent usually deemed efficient for treatment of water or the like flowing through it. In some cases useful results, at least to a certain extent, may be had with chloromelamine solutions containing as little as about 10 P. P. M. available chlorine, and while for avoidance of harm to many resins the chlorine concentration ought to be not more than about 100 P. P. M., it is possible to use up to 200 P. P. M. or so available chlorine for treating certain ion exchange resins that are particularly resistant to attack by oxidizing agents. In point of quantity of the solution, as little as 5 gallons, for instance, per cubic foot of resin is sometimes useful, especially when the chlorine concentration is relatively high. According to present experience, optimum results are obtained with quantities of the order of 30 to 40 gallons per cubic foot, and it will be understood that considerably greater amounts may be used without serious harm, although a substantial excess may be not only unnecessary but definitely uneconomical.

The treatment is conveniently performed by passing the described sterilizing solution once through the ion exchange bed, and it appears that for thorough sterilization the time of contact, i. e. the total time of flow-through, should usually be at least about 20 minutes. Thus one specific example of an effective sterilization treatment of a bed of ion exchange resin of either anionic or cationic type is as follows: A water solution of trichloromelamine containing 50 P. P. M. available chlorine is used in the amount of 35 gallons per cubic foot of resin, and is caused to flow through the bed in such manner that the passing liquid comes in contact with all parts of the latter, and at such rate that from 20 minutes to a half hour are required for the entire quantity of solution to pass slowly and continuously through the bed. The time of contact can be varied as conditions appear to demand; some sterilization can be accomplished even in about 5 minutes, and yet in many cases a contact time of considerably longer than 20 minutes may be desirable for a particular thorough effect. Present experience indicates that very long periods, for instance greater than one hour, may involve some danger to the resin bed, particularly if used routinely or periodically.

As indicated above, the treatment may be conveniently applied at the time the ion exchanger is removed from use, for regeneration. For example the chloromelamine solution may be fed through the bed just before the regeneration cycle begins. Operation in this manner is appropriate for either the cationic or anionic types of exchanger and has the advantage that the regeneration treatment to follow rids the bed of every possible trace of active chlorine before it is reinstated in service. There may be a disadvantage if the bed itself has become heavily fouled with slime or is badly channeled, i. e. in that uniform treatment with the sterilizing agent may be correspondingly prevented. Another possible disadvantage, particularly in the case of the cationic type of exchange materials, is that the regeneration treatment itself may then immediately introduce some new contamination into the exchanger bed.

As will be understood, the usual regenerative treatment for materials of this sort involves first a backwashing with ordinary water, then the application of a solution of the regenerative reagent, and finally a rinse, preferably with highly pure water. Accordingly, another and often more advantageous mode of operation is to apply the sterilizing solution to the bed after the backwashing is complete and before the regenerative solution per se is introduced. Under such circumstances, the backwashing has then already placed the bed in good physical condition for the sterilizing step, while the subsequent operations of regeneration and rinsing will insure removal of all traces of active chlorine from the ion exchange material.

In the case of cationic exchangers used in the socalled hydrogen cycle, the regenerative treatment per se involves application of a dilute solution of a strong acid. Since it is unlikely that organic contamination, e. g. living bacteria or fungi, can be introduced into the bed in such a solution, there is no corresponding disadvantage in performing the sterilizing step between backwashing and the acid regenerative treatment. In the case, however, of cationic exchangers used in the sodium cycle, and also of anionic exchangers, the backwashing is followed by regeneration respectively with a strong sodium chloride solution or with a sodium carbonate solution, and in either event it is quite possible that new contamination may be introduced by the regenerating liquid. Hence to the extent that sterility of such liquids cannot be assured, it may be objectionable to carry out the chloromelamine treatment between backwashing and regeneration per se.

Whereas it seems undesirable, at least in most cases, to try dissolving the stated chloromelamine in the acid solution used for regenerating a cationic exchanger in the hydrogen cycle (since the acid appears to activate the chloromelamine, rendering it chemically destructive of the capacity or other properties of the resin), no objectionable results have been observed with the other types of exchangers, for example when the chloromelamine is incorporated directly in the water solution of sodium chloride or sodium carbonate used for regeneration. Indeed under these circumstances an effective and economical procedure, both safe for the resin and proof against immediate recontamination, is achieved simply by dissolving the chloromelamine in the regenerating solution. The amount of the chloromelamine used may be governed by the values indicated above, i. e. to attain a suitable content of available chlorine (having regard, as in other cases, to degree of chlorination in the compound or compounds and to the total amount of solution); the quantity of the liquid per cubic foot of exchanger and the contact time should likewise preferably fall within the ranges stated above, it being a special advantage of the invention that the preferred values of volume and contact time agree very well with those commonly employed for regenerating solutions of the sort mentioned. The final rinse after the combined sterilizing and regenerating step, is adequate to remove the available chlorine from the bed and prevent its remaining to have any deleterious effect (over a long time) on the exchanger, and since fairly pure water is commonly used for this ultimate rinse, there is small likelihood of introducing new contamination.

Another mode of operation, applicable to all types of exchangers, is to apply the sterilizing solution as a separate step after the regeneration per se and before the last rinsing. Although this procedure requires an additional step as compared with the method last mentioned, the pressurized nature or other mechanical features of the apparatus employed for regeneration may make it impractical, in some systems, to introduce the chloromelamine into the regenerating solution. In any event, proceeding by way of a separate sterilizing step between regeneration and the final rinse is highly effective for anionic exchangers and for both types of cationic exchangers, providing through penetration of the bed and adequate removal of chlorine in each instance, and likewise avoiding re-contamination.

Extensive tests tend to indicate (at least according to present belief) that the specified chloromelamine compositions are unique among a considerable number of chlorine-containing substances, in providing adequate sterilization of the organic-type ion exchange materials without destructive action on the latter either by too rapid release of active chlorine or by reaction of the resin with some other component of the chlorine-containing substance, the chlorinated melamines, moreover, being sufficiently soluble as to permit their use, at satisfactorily high concentration, in volumes of water of reasonably moderate size.

The sterilizing efficiency of the present process has been demonstrated not only in practical operations but also in elaborate tests of a comparative nature, designed to present unusually severe cases of contamination. For instance, in one such series of tests a quantity of an ion exchange resin of the cationic type, known as Amberlite IR-100, was inoculated with organisms of the species *Aerobacter aerogenes* and permitted to stand for about two weeks in a nutrient medium to promote growth. The contamination had then reached the point of about 50,000 organisms per gram of resin. Portions of the contaminated resin were thereafter treated with 5% sodium chloride solutions (simulating a regenerating solution) containing different amounts of trichloromelamine, for various periods of time. At the end of each period a sample of resin was withdrawn (i. e. from each portion treated with a given concentration of trichloromelamine) and treated with a dechlorinating agent. From each such sample a number of test samples, one gram apiece, were taken and introduced into culture tubes containing nutrient broth. They were then incubated to permit growth of any organisms present, and were thereafter bacteriologically examined to detect the occurrence of growth in the broth, i. e. to determine whether live organisms survived the chloromelamine treatment as indicated by the presence or absence of such growth.

The results of the tests are summarized in the following table, wherein the various concentrations of trichloromelamine used are represented by P. P. M. available chlorine. The treating solution was used in the quantity of 32 gallons per cubic foot of wet resin.

*Table I*

| P. P. M. Avail. Cl₂ | Presence of organisms after | | |
|---|---|---|---|
| | 10 min. | 20 min. | 30 min. |
| 0 | + | + | + |
| 10 | + | + | ± |
| 20 | ± | − | − |
| 30 | ± | − | − |
| 40 | ± | − | − |
| 50 | + | − | − |

In the table, + means that growth occurred, — means that it did not, and ± means that it occurred in some tubes and not in others of the given set of test samples corresponding to a particular chlorine concentration and time of treatment. It will be seen that under the severe circumstances of these tests the application of 20 P. P. M. chlorine or more, for 20 minutes or more, yielded positive, i. e. complete sterilization.

The fact that the procedure does not impair the ion exchange capacity of the resins was also demonstrated by special tests of an extremely rigorous sort. In one such set of tests several ion exchange resins of the cationic type (sodium cycle), respectively known by the names given below, were made in the form of beds and each put through a series of 150 complete cycles of use and regeneration. Specifically, each cycle consisted of: exhaustion of the bed with water containing calcium carbonate hardness; backwashing; regeneration with 5% sodium chloride solution; and finally rinsing with water. Each resin was set up in duplicate; one of the two beds was treated only with plain water in the backwashing and not with any sterilizing agent at any time, and the other was treated with trichloromelamine applied in the backwashing, i. e. preceding regeneration. For each backwashing of the latter type a water solution of trichloromelamine affording 100 P. P. M. available chlorine was used in an amount equal to 120 gallons per cubic foot of resin, for a contact period of 15 minutes. The ion exchange capacity of each bed of resin was measured at the end of the series of 150 cycles, and the following table gives the values found for such capacity, in units commonly used for such determination, viz. gram milliequivalents per milliliter of resin.

*Table II*

| Name of Resin | Final Capacity of Resin | |
|---|---|---|
| | Treated with pure water | Treated with chloromelamine |
| Amberlite IR-100 | 0.33 | 0.33 |
| Dow X-50 | 0.935 | 0.91 |
| Duolite C-3 | 0.335 | 0.335 |

It will be noted that even after the 150 cycles of operation and regeneration, the beds which had been treated with chloromelamine in each cycle were equal in capacity to those which received no such treatment; and the final capacity of all the beds was still of a useful value. At the rate of one cycle per week, which is rather frequent for domestic softening units, the 150 cycles of the test correspond to about three years of service.

By way of a further example of the invention as particularly related to such units, a satisfactory solution for use in the process can be made up as follows: For domestic softening equipment of a common size, employing one and one-half cubic feet of resin, 50 gallons of sterilizing solution having a content of 50 P. P. M. are made by dissolving 10 grams trichloromelamine in 50 gallons of water. It will be appreciated that trichloromelamine contains 46.35% active chlorine, which means (as is well understood in the art) 92.7% available chlorine; and references herein to P. P. M. chlorine concentrations of solutions are intended to mean available chlorine in parts per million. As will also be appreciated, mono-, di-, and tetrachloromelamine contain respectively 22.1%, 36.4% and 53.9% active chlorine, and are considered to have twice those percentages of available chlorine.

While the selected chloromelamines are capable of solution in water in ample proportions at equilibrium, they attain such equilibrium, as a rule, only very slowly and with difficulty when they are simply introduced as pure, dry powders. It is hard to get water to wet them, and even if the initial wetting is accomplished, their rate of dissolving is still extremely slow.

Accordingly a further feature of the invention resides in a novel, solid composition, peculiarly adapted for sterilizing treatment of ion exchange resins, and having a ready and rapid solubility in water, such composition consisting essentially of chloromelamine (i. e. one or more of the compounds which contain not more than four active chlorine atoms for each melamine group), together with material, inert in the sense of adverse effect on ion exchange resins or on the sterilizing function of the chloromelamine, for promoting solution of the reagent. Thus the composition may consist of an intimate, uniform mixture of chloromelamine and one or more diluents of the character last stated, the whole being conveniently a solid in powdered, granular or like divided form, so that it may be easily packaged, measured and handled for the intended purpose.

A particularly suitable diluent with which the mixture may be made is an inert salt, very preferably a salt which (being employed in an anhydrous condition) reacts chemically with water to form a hydrate, i. e. to take up water of crystallization. An advantageous method of preparing the composition is first to mix a suitable amount of the chloromelamine material, for instance trichloromelamine, intimately with water, as in a ball mill. Then while the wet trichloromelamine remains in the mill, the anhydrous salt is added gradually, with continued mixing, for the desired reaction with the water. It will now be appreciated that by introducing a sufficient amount of the salt, all of the moisture becomes bound up as water of crystallization, and the final mixture is a dry powder. This product is easily handled for storage and transportation and for measurement into desired quantities, and when actually used to make up a sterilizing solution, it is wet very readily by water, and can be dissolved rapidly and without difficulty.

By way of specific example one part by weight of trichloromelamine and one part by weight of water are first mixed intimately together, e. g. in a ball mill, and then two parts by weight of anhydrous disodium dihydrogen pyrophosphate ($Na_2H_2P_2O_7$) are added slowly to the wet mass in the ball mill, with continued mixing. The product is a substantially dry, divided solid which is admirably adapted for the desired purpose, in that it is easily wet and readily dissolved, simply by putting it into water, to make up sterilizing solutions for ion exchange beds. Examples of other salts which may be similarly employed, i. e. in lieu of the stated phosphate, are anhydrous sodium sulfate and anhydrous magnesium sulfate, e. g. to be used in amounts about the same as, or somewhat greater than the chloromelamine itself, the quantity of water being such as will be substantially all taken up as water of crystallization in the added salt, and conveniently enough to satisfy the requirements of the added salt for water to be so taken up.

In some instances other inert salts may be used, i. e. instead of those which form hydrates. For example sodium chloride can be employed in approximately corresponding amount. In using the last mentioned substance, it is mixed into the wet mixture of chloromelamine and water, say in a ball mill, in the previously described manner; but in order to have a substantially dry product, it is then necessary to dry the final mixture, a step not required when salts of the preferred character are used.

The diluent material should be a salt, i. e. an inorganic salt, which is not hydrolyzed by water to give high acid or base concentration. Sodium carbonate, for instance, would not be suitable as an inert diluent, because in water it yields a solution which is too alkaline; thus the diluent material in the new composition can advantageously be characterized as incapable of producing a highly alkaline or highly acid solution, or rather as exhibiting, in water solution, no substantial departure from neutrality, i. e. meaning that any such departure which it may exhibit, in either direction, is substantially less than that yielded by sodium carbonate. Peculiarly suitable substances are alkali and alkaline-earth salts of inorganic acids, i. e. strong inorganic acids (such as sulfuric, phosphoric, hydrochloric), having the described neutral or nearly neutral character in solution.

Another element of the composition, which may enhance its utility or suitability, comprises a wetting agent, e. g. an agent of the anionic type (or in some cases of nonionic character) as distinguished from the cationic wetting agents. A particular advantage of including such material is not only that it affords further wetting properties, but also that it permits effective results with considerably less diluent material. By way of example, nine parts of trichloromelamine are treated with a mixture of one part of water and two parts of a wetting agent which is known as Naccanol-NR and which is understood to comprise an aralkyl sulfate. These ingredients are thoroughly and intimately mixed together, and while mixing continues, one part of anhydrous magnesium sulfate is added (all parts being designated by weight). Upon completion of mixing, the product is a dry, powdery material, which is wet very easily by water and is readily dissolved.

A still further advantage of including a wetting agent of the described character is that it appears quite definitely to increase the efficiency of sterilization, e. g. in that with a given concentration of available chlorine and a given total quantity of solution and contact time, more certain sterilization is found to occur if the wetting agent is present. Thus specifically Naccanol-NR, which is an anionic wetting agent, has been found to afford such results, and other anionic wetting agents, such as sodium tetradecyl sulfate, are equally efficacious in enhancing solubilization of the chloromelamine and in increasing germicidal effectiveness.

Preferably, and indeed essentially for any useful effect where no wetting agent is included, the inert diluent (e. g. the inorganic salt, considered in its anhydrous form if it is so introduced) should constitute at least about 5% of the composition. Referring further to circumstances when there is no wetting agent employed, an inert diluent content of 10% is found to afford quite useful improvement in the dissolving characteristics of the chloromelamine, and it is presently preferred, for distinctly superior results without a wetting agent, that the diluent salt constitute 20 to 50 per cent or so, of the total ingredients. As indicated, when the salt takes up or has water of crystallization these percentages refer to the proportion of the salt considered in, or as if in, the anhydrous form.

As stated, the composition is peculiarly useful for the procedure of sterilizing ion exchange bodies. Solutions can be made up merely by incorporating the composition in the necessary quantity of water, or in the solutions already prepared for regenerating purposes; indeed, it appears sufficient, at least in some cases where the bed of ion exchange resin is readily accessible, simply to apply the divided composition as a heap or layer on the upper surface of the bed, and then to wash through the bed with a suitable quantity of water or of previously prepared regenerating solution, at an appropriate rate and in accordance with the preferred conditions indicated hereinabove.

The various forms of procedure disclosed herein have been found peculiarly effective for sterilizing ion exchange bodies, including beds of other organic materials, of which the carbonaceous zeolites are an example; indeed, as already indicated, the several steps and products are applicable with good results to all types of ion exchange materials. By performing the sterilizing process at suitable intervals, the bed can be kept in a clean, fully operative condition, and a particular feature of the invention is that organic materials such as the ion exchange resins are not adversely affected by oxidizing or other reactive properties of the chloromelamine solutions used in the process.

It is to be understood that the invention is not limited to the specific procedures and compositions herein set forth by way of illustration, but may be carried out in other ways and forms, without departure from its spirit as defined by the following claims.

What is claimed is:

1. A method of sterilizing a body of ion exchange resin, comprising treating said resin with an aqueous solution of chloromelamine containing not more than four active chlorine atoms for each melamine group, said chloromelamine being present in said solution in a quantity providing at least about 20 P. P. M. available chlorine.

2. A method of sterilizing a body of organic ion exchange material susceptible of deterioration by free available chlorine and hypochlorites, comprising treating said material with an aqueous solution of chloromelamine containing not more than four active chlorine atoms for each melamine group, said chloromelamine being present in a quantity providing from about 10 to 200 P. P. M. available chlorine.

3. A method of sterilizing a body of ion exchange material, comprising treating said material with chloromelamine containing not more than four active chlorine atoms for each melamine group, said treatment comprising carrying said chloromelamine in aqueous solution through said material, said chloromelamine being present in said solution in a quantity providing at least about 10 P. P. M. available chlorine.

4. A method of sterilizing a body of organic ion exchange material, comprising treating said material with an aqueous solution of chloromelamine containing not more than four active chlorine atoms for each melamine group, the quantity of such solution being not less than about five gallons per cubic foot of ion exchange material and said chloromelamine being present in a quantity providing from about 10 to 200 P. P. M. available chlorine.

5. A method of sterilizing a body of ion exchange resin, comprising treating said resin with an aqueous solution of chloromelamine containing not more than four active chlorine atoms for each melamine group, the quantity of said solution being not less than about ten gallons per cubic foot of resin and said chloromelamine being present in a quantity providing from about 20 to 100 P. P. M. available chlorine.

6. A method of sterilizing a body of organic ion exchange material susceptible of deterioration by free available chlorine and hypochlorites, comprising passing through said body and in contact with said material thereof, an aqueous solution of chloromelamine containing not more than four active chlorine atoms for each melamine group, the quantity of said solution being not less than about five gallons per cubic foot of resin, said chloromelamine being present in a quantity providing from about 10 to 200 P. P. M. available chlorine, and said operation of passing the solution through the body being performed at a rate providing a total contact time of the solution with the material of about five minutes to one hour.

7. A method of sterilizing a body of ion exchange resin, comprising passing through said body and in contact with said resin, an aqueous solution of chloromelamine containing not more than four active chlorine atoms for each melamine group, the quantity of said solution being not less than about thirty gallons per cubic foot of resin, said chloromelamine being present in a quantity providing from about 20 to 200 P. P. M. available chlorine and the operation of passing the solution through the body being performed at a rate providing a total contact time of the solution with the resin of at least about twenty minutes.

8. A method of sterilizing a body of ion exchange material, comprising treating said material with an aqueous solution of chloromelamine containing not more than four active chlorine atoms for each melamine group, the quantity of said solution being not less than about five gallons per cubic foot of material, said chloromelamine being present in a quantity providing from about 10 to 200 P. P. M. available chlorine, and said material being maintained in contact with at least successive portions of said solution for a total time of at least about five minutes.

9. A method of sterilizing a body of ion exchange material, comprising treating said material with an aqueous solution of chloromelamine containing not more than four active chlorine atoms for each melamine group, said chloromelamine being present in a quantity providing at least about 10 P. P. M. available chlorine and said treatment providing contact of said solution with said material for at least about five minutes.

10. A method of sterilizing a body of ion exchange resin, comprising passing through said body and in contact with said resin, an aqueous solution of trichloromelamine, the quantity of said solution being not less than about ten gallons per cubic foot of resin, the said trichloromelamine being present in a quantity providing from about 20 to 100 P. P. M. available chlorine and the operation of passing said solution through the body being performed at a rate providing a total contact time of the solution with the resin of at least about twenty minutes.

HENRY CLAY MARKS.

REFERENCES CITED

The following references are of record in the file of this patent:

UNITED STATES PATENTS

| Number | Name | Date |
|---|---|---|
| 1,988,991 | Albertshauser | Jan. 22, 1935 |
| 1,989,380 | Romans | Jan. 29, 1935 |
| 2,166,362 | MacMahon | July 18, 1939 |
| 2,184,883 | Muskat et al. | Dec. 26, 1939 |